June 30, 1925.

1,544,472

D. H. MOORE

CONDIMENT HOLDER

Filed March 7, 1924

Inventor.
DANIEL H. MOORE
By Victor J. Evans
Attorney.

Patented June 30, 1925.

1,544,472

UNITED STATES PATENT OFFICE.

DANIEL H. MOORE, OF PORTLAND, OREGON.

CONDIMENT HOLDER.

Application filed March 7, 1924. Serial No. 697,584.

*To all whom it may concern:*

Be it known that I, DANIEL H. MOORE, a citizen of the United States, residing at Portland, in the county of Multnomah and State of Oregon, have invented new and useful Improvements in Condiment Holders, of which the following is a specification.

This invention relates to improvements in condiment holders, such as salt and pepper shakers, and has particular reference to an attachment for a condiment holder cover.

The principal object of this invention is to provide means associated with the cover which will prevent the commodity in the holder from clogging, render the same moisture proof, and at the same time serve as a spreader for the commodity.

Another object of this invention is to produce an attachment of the character described which is automatic in operation and self cleaning.

A still further object is to produce an attachment of this nature which is simple in construction, economical to manufacture, ornamental in appearance, highly serviceable in use and extremely sanitary.

Other objects and advantages will be apparent during the course of the following description.

Figure 1:
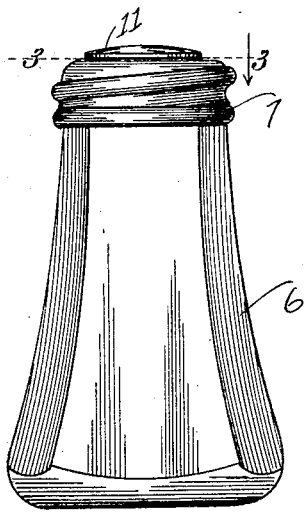
Figure 2:
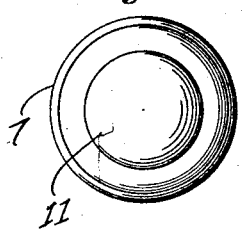
Figure 3:
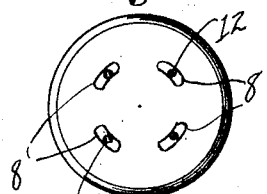
Figure 4:
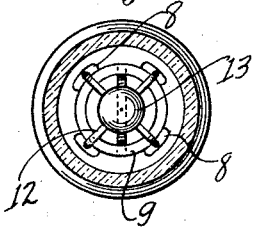
Figure 5:
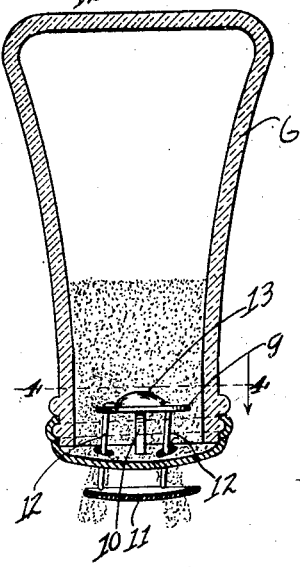

In the accompanying drawings forming a part of this specification, and in which like numerals are employed to designate like parts throughout the same, Figure 1 is a side elevation of a condiment holder showing my attachment applied thereto, Figure 2 is a top plan view of the same, Figure 3 is a horizontal section on the line 3—3 of Figure 1, looking in the direction of the arrow, Figure 4 is a similar view taken on the line 4—4 of Figure 5, looking in the direction of the arrow, and Figure 5 is a longitudinal vertical section through an inverted condiment holder showing the attachment partly in section and partly in elevation.

In the use of condiment holders great annoyance has been experienced due to the fact that the commodity in the holder often becomes clogged, particularly so in damp weather, and it is difficult to dispense the same. To overcome this annoyance I have devised an attachment for the cover of a condiment holder whereby a commodity such as salt will be maintained in a dry state and I have further provided means which will serve to prevent a clogging of the commodity so that the same can be readily dispensed and spread on the article of food to be seasoned.

In the accompanying drawings wherein for the purpose of illustration is shown a preferred embodiment of my invention, the numeral 6 designates a condiment holder for a commodity such as salt or pepper, which holder has positioned thereon a cover 7. This cover 7 has formed therein spaced narrow openings or apertures 8 of varying length, while positioned beneath the surface of the cover, I have provided a ring 9 which is preferably soldered to the under surface of the cover through the medium of standards 10. This ring acts as a guide and stop, which function will be hereinafter more fully explained.

The numeral 11 indicates a concave lid which has depending therefrom and passing through the apertures 8 a plurality of spaced thin wires 12. These wires are preferably made of steel and are disposed at an angle with relation to the lid so that they can be angularly disposed with relation to the apertures 8 of the cover 7 for arcuate movement thereof.

It will be observed that the wires are inwardly bent adjacent their extremities with the ends soldered together so as to form a head 13, which wires contact the outer periphery of the ring 9. This ring is so positioned with relation to the wires that a combined stop and guide for the wires is formed. By soldering the ends of the wires so that they are united a substantially vertical movement of the wires through the apertures is realized and by disposing the wires at an angle with relation to the lid an arcuate movement is accomplished whereby the attachment can be utilized to prevent a clogging of the commodity such as salt in the apertures 8.

It is to be understood that when the container holds a commodity such as pepper, the apertures are more restricted so that there will not be a too ready passing of the pepper through the apertures in the cover.

Due to the concave formation of the lid a close affinity between the top of the cover and the under surface of the lid is realized so that the danger of dampness to the commodity will be reduced to a minimum.

In the operation of my device when it is desired to dispense the commodity, it is only necessary to incline the container and the commodity, such as salt, will readily pass through the apertures 8 and then contact with the under surface of the lid will be shaken therefrom, which lid serves as a spreader for sprinkling the salt on the food product. The ring 9 serves to limit the downward movement of the soldered piece 13 but also acts as a guide and maintains the wires in alignment with the apertures 8. If any clogging of the commodity in the apertures occurs, then it is only necessary to grasp the lid in the fingers and move the same through an arc of a circle and the apertures will be readily freed from any of the commodity remaining therein.

In practice I propose to have the upper surface of the lid in a highly finished state so that initials can be readily engraved thereon, thus tending to enhance the attractiveness of the commodity holder.

It is to be understood that the form of my invention herewith shown and described is to be taken as a preferred example of the same and that various changes in the shape, size and arrangement of parts may be resorted to without departing from the spirit of the invention or the scope of the subjoined claim.

Having thus described my invention, I claim:—

In combination with a condiment holder having an apertured cover, a concave lid for normally engaging the upper surface of said cover, the apertures of said cover being arcuate in shape, a plurality of wires secured to said lid and penetrating the apertures of the cover, the ends of said wires being connected to each other at their free ends so as to form a head, a ring suspended from the under surface of the cover and adapted to be contacted by the head formed by said depending wires when said condiment holder is in an inverted position.

In testimony whereof I affix my signature.

DANIEL H. MOORE.